United States Patent Office 3,606,541
Patented Sept. 20, 1971

3,606,541
CONTACT-LESS PROBE SYSTEM
Tutomu Sugano and Makoto Kikuchi, Kamakura, Japan, assignors to Mitsubishi Denki Kabushiki Kaisha, Chiyoda-ku, Tokyo, Japan
Filed Sept. 23, 1969, Ser. No. 860,263
Claims priority, application Japan, Sept. 28, 1968, 43/70,538
Int. Cl. G01b *11/30*
U.S. Cl. 356—120
2 Claims

ABSTRACT OF THE DISCLOSURE

A collimated light reflected from an object is passed through a vibrating pinhole and converted into an AC and a DC component controlled in gain with the light intensity. The polarity of the AC component is phase detected and cooperates with the level of the DC component to determine if the system is within its operative region. When the system is outside the operative region, the phase detected component and the DC level cause the system to enter the operative region. When in its operative region, the system controlled by the phase detected component is maintained in a predetermined position.

BACKGROUND OF THE INVENTION

This invention relates to improvements in a contact-less probe system utilizing laser light.

In order to determine the geometry of objects to be tested, there have been previously known copying apparatus, surface roughness gauges etc. utilizing the mechanical probe. The pointed end of the probe may be decreased in diameter to attain a high accuracy of measurement but such a technique is disadvantageous in that the surfaces of the objects may be damaged. For example, assuming that the probe has a pointed end having a diameter of 10 microns, even when a total contact force as low as 1 gram is applied to the probe, a high pressure amounting to several hundred kilograms per square centimeter is applied to the object's surface with the result that the surface of the object may be damaged or scratched.

Thus the so-called contact-less probe systems utilizing a beam of laser light in place of the mechanical probe have such merits as a high accuracy of measurement, and a high efficiency of measurement or a decrease in measuring time and therefore have a wide variety of applications. For example, in addition to determining the geometry of clay models for motor vehicles and testing the geometry and surface roughness of precision components, they are applicable to various fields of industry, for example, where a lathe is to machine a component while its dimension is measured until the specified dimension is reached without suspending operation of the lathe.

The conventional type of contact-less probe systems referred to have been disadvantageous in that the same length of movement has provided different output voltages, and the output voltages have been of zero magnitude not only at a focus of a searching lens involved but also on both sides remote therefrom and that once the system has entered either of those sides, the associated servo system has been disabled.

SUMMARY OF THE INVENTION

Accordingly it is an object of the invention to provide a new and improved contact-less probe system utilizing laser light with a high degree of both safety and efficiency in the continuous mode of operation.

It is another object of the invention to provide a new and improved contact-less probe system of the type as described in the preceding paragraph reliable in operation in spite of the distance between an object to be measured and a searching lens involved.

The invention accomplishes these objects by the provision of a contact-less probe system for determining the geometry of an object to be tested, comprising a source of light for producing a parallel beam of light, lens means for focusing the parallel beam of light from the source onto a point on the surface of the object, pinhole means disposed so as to receive a beam of light reflected from the point on the surface of the object, the pinhole means vibrating in a direction substantially parallel to the optical axis of the reflected beam of light to modulate the intensity of the reflected beam of light, light sensor means for sensing the intensity modulated light from the pinhole means to provide an electric output, phase detector means for phase detecting the output from the light sensor means while an electric waveform representing the vibration of the pinhole means is used as a reference signal, and servo-motor means driven with the output from the phase detector means to maintain a constant distance between the lens means and the object thereby to determine the geometry of the object, characterized by splitting means for splitting the electric output from the light sensor means into a direct current signal and an alternating current signal, control means for controlling the gains of the direct and alternating current signals in accordance with the intensity of the reflected beam of light, the phase detector means phase detecting the gain controlled alternating current signal, means for determining both the output level of the gain controlled direct current signal and the polarity of the output from the phase detector means to determine the operative region of the system.

In a preferred embodiment of the invention, the contact-less probe system may comprise a source of light for producing a parallel beam of light, first lens means for focusing the parallel beam of light from the source onto a point on a surface of an object to be tested the lens means being operative to collimate a beam of light reflected from the point on the surface of the object, a first semi-transparent mirror member for reflecting the collimated beam of light passed through the first lens means, a second semi-transparent mirror member for transmitting one portion of the collimated beam of light reflected from the first semi-transparent mirror member and reflecting the remaining portion of the collimated beam of light, second lens means for focusing the beam of light passed through the second semi-transparent mirror member, a pinhole plate normal disposed at the focus of the second lens means and vibratable in a direction substantially parallel to the optical axis of the second lens means to modulate the intensity of the beam of light from the second lens means, first light sensor means for sensing the intensity modulated beam of light to provide an electrical signal, signal splitter means for receiving the electrical signal to split it into a signal portion of alternating current and a signal portion of direct current, second light sensor means for sensing the beam of light reflected from the second semi-transparent mirror member to provide a direct current signal, first and second gain control means responsive to the direct current signal from the second light sensor means to control the gains of the signal portions of alternating and direct currents produced by the signal splitter means respectively, phase detector means for phase detecting the alternating current signal portion from the first gain control means, level determination means for determining a level of the direct current signal provided by the second gain control means, polarity determination means for determining whether the output from the phase detector means is positive or negative, a movable probe table having disposed thereon the above-mentioned optical systems, and means responsive to the results of the determination effected by both the level and polarity determination means to apply a control signal to the movable probe table.

BRIEF DESCRIPTION OF THE DRAWINGS

The invention will become more readily apparent from the following detailed description taken in conjunction with the accompanying drawings in which.

DESCRIPTION OF THE PREFERRED EMBODIMENT

Figure 1:
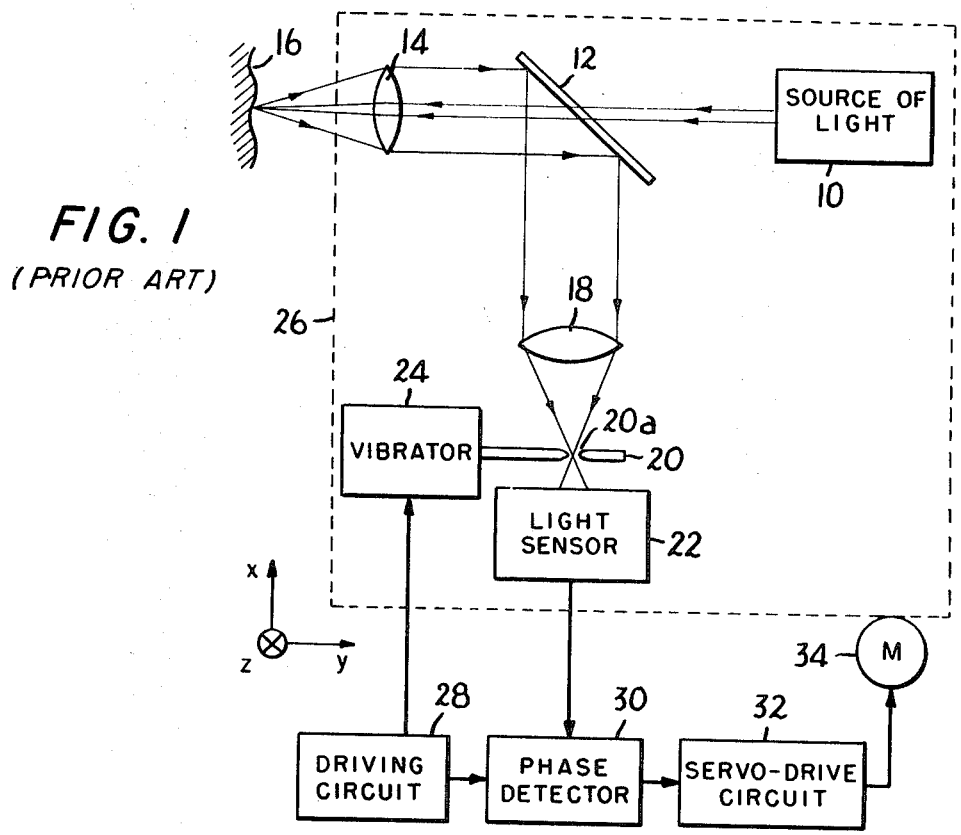
FIG. 1 is a schematic view of a contact-less probe system constructed in accordance with the principles of the prior art.

Referring now to the drawings and FIG. 1 in particular, there is shown a contact-less probe system of conventional construction. The arrangement illustrated comprises a source 10 of light, such as a laser device for producing a parallel beam of light, a semi-transparent mirror or a half-silvered plate 12 disposed at an angle of substantially 45 degrees to the axis of the parallel beam of light from the source 10 to transmit the beam of light, and a searching lens 14 for focusing the beam of light transmitted through the mirror 12 onto a point on a surface of an object 16 to be measured. The light focused on the point on the object 16 is reflected therefrom toward the lens 14, which in turn, collimates it into a parallel beam of light. This collimated or parallel beam of light is at least partly reflected from the semi-transparent mirror 12 toward a focusing lens 18 having an optical axis substantially perpendicular to that of the searching lens 14. The lens 18 functions to focus the parallel beam of light reflected from the mirror 12 at its focus.

The system further comprises a pinhole plate 20 having formed therein a pinhole 20a normally disposed at the focus of the lens 18, and a light sensor 22 such as a photocell disposed so as to receive a quantity of light emerging from the pinhole 20a. The pinhole plate 20 is operatively connected to a vibrator 24 for the purpose that will be apparent hereinafter.

All the components as above described except for the object 16 are disposed on a movable probe table 26 movable in three orthogonal directions comprising, for example the x direction parallel to the optical axis of the lens 18, the y direction parallel to the optical axis of the lens 14 and the z direction perpendicular to the x and y directions, in the manner as will be described later.

As shown in FIG. 1, a driving circuit 28 is disposed outside the probe table 26 to drive the vibrator 24 to thereby vibrate the pinhole plate 20 and therefore its pinhole in a direction parallel to the optical axis of the lens 18 to a limited small extent for the purpose that will be apparent hereinafter. The driving circuit 28 is connected to a phase detector 30 having also applied thereto the output from the light sensor 22. The phase detector 30 is connected to a servo-drive circuit 32 for driving a servomotor 34 serving to drive the probe table 26.

Assuming that the abovementioned point on the object 16 is disposed a distance from the searching lens 14 equal to its focal distance $f_1$, the lens 14 is effective to focus the parallel beam of light from the source 10 at that point and therefore a quantity of light passed through the pinhole 20a has a maximum magnitude. As the object 16 is moved toward or away from the lens 14 to change the distance therebetween from the focal distance $f_1$ of the lens 14, the quantity of light emerging from the pinhole will decrease. If the pinhole plate 20 and therefore its pinhole 20a is maintained stationary, the quantity of light emerging from the pinhole will change as shown by the curve labelled "LIGHT" in FIG. 3 wherein the ordinate represents the quantity of light emerging from the pinhole 20a and the abscissa represents a deviation $y_1$ of the distance between the object 16 and the searching lens 14 from the focal length $f_1$ of the latter, measured in the y direction as above described. The deviation $y_1$ is positive when the object is located outside the focal distance $f_1$ and negative when the object is located within the focal distance.

Figure 3:
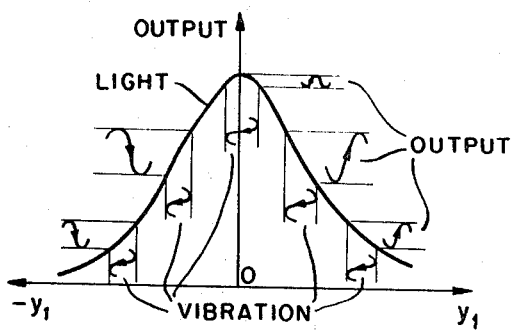
FIG. 3 is a graph illustrating a waveform of optical output from the pinhole shown in FIGS. 1 and 2 and waveforms of a modulated output from the light sensor also shown in FIGS. 1 and 2.

As above described, the pinhole 20a vibrates along the optical axis of the lens 18. Therefore even if the distance between the object 16 and the searching lens 14 is maintained equal to the focal distance of the lens 14, the quantity of light emerging from the pinhole 20a is modulated in intensity or brightness and the light sensor 22 provides an output correspondingly modulated with the vibration frequency of the pinhole plate 20. FIG. 3 also illustrates the waveforms labelled "OUTPUT" of the modulated output from the light sensor 22 at different levels of light emerging from the pinhole 20a on the outside of the curve "LIGHT" and the corresponding waveforms of the vibrating pinhole labelled "VIBRATION" on the inside of the curve "LIGHT."

As shown in FIG. 3, the output waveform from the light sensor 22 is in phase with the vibration waveform of the pinhole 20a for the deviation $y_1<0$, and the output waveform is opposite and out of phase with the vibration waveform for $y_1>0$. If $y_1=0$ then the output waveform has a frequency equal to twice the frequency of the vibration waveform. Further the output waveform from the light sensor 22 has an amplitude dependent upon the magnitude of the deviation $y_1$. More specifically, one point where the output waveform has a maximum amplitude appears on each of the slopes of the curve "LIGHT" for the light emerging from the pinhole 20a or for each of the vibration waveforms identical and opposite in phase to the output waveform from the light sensor 22. As the operating point on the curve departs from the said point corresponding to the maximum amplitude the output waveform progressively decreases in amplitude. Therefore the phase detection of the output from the light sensor 22 provides such a waveform that its amplitude is zero at $y_1=0$ and increases in each of the positive and negative y directions to a maximum followed by a progressively decreasing to zero.

Figure 4:
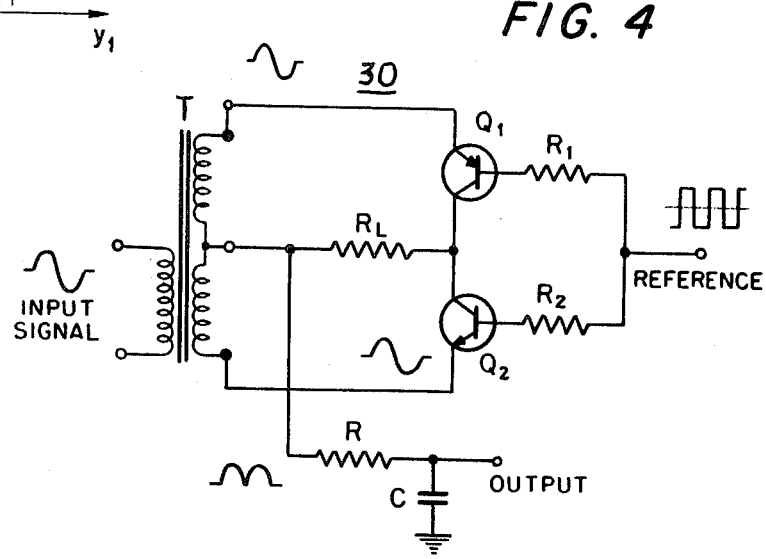
FIG. 4 is a circuit diagram of the phase detector illustrated in FIGS. 1 and 2.

The phase detection of the output waveform from the light sensor 22 may be accomplished by a phase detector 30 as shown in FIG. 4. The arrangement illustrated comprises a transformer T including a primary winding and a center-tapped secondary winding connected across a pair of transistors $Q_1$ and $Q_2$ including the emitter electrodes connected to both ends of the secondary transformer winding respectively, collector electrodes connected together to the center tap on the secondary winding through a load resistor $R_L$ and base electrodes connected to a reference terminal through the respective base resistors $R_1$ and $R_2$. The conventional dot method is used to indicate an instantaneous polarity of a voltage across each winding of the transformer T. The center tap on the secondary transformer winding is also connected to an output terminal through an RC rectifier or filter including a series resistor R and a parallel capacitor C.

When the reference terminal has applied thereto a rectangular reference pulse by the drive circuit 28, either one of the transistors $Q_1$ or $Q_2$ is turned ON and the other transistor $Q_2$ or $Q_1$ is turned OFF in accordance with the polarity of the pulse. The reference pulses are shown in FIG. 4 adjacent the reference terminal. For example, the transistors $Q_1$ and $Q_2$ are shown as being of PNP and NPN types adapted to be turned OFF and ON respectively in response to the positive polarity of the reference pulse and to be turned ON and OFF respectively in response to the negative polarity thereof. If an input signal (which is shown in FIG. 4 adjacent the input) identical in phase to the reference pulse is applied across the primary winding of the transformer T through the input, then a positive voltage is produced at the output. However if an input signal opposite in phase to the reference pulse is applied across the primary transformer winding, then a negative voltage is provided at the output. The output voltage from the phase detector 30 is shown in FIG. 5.

Figure 5:
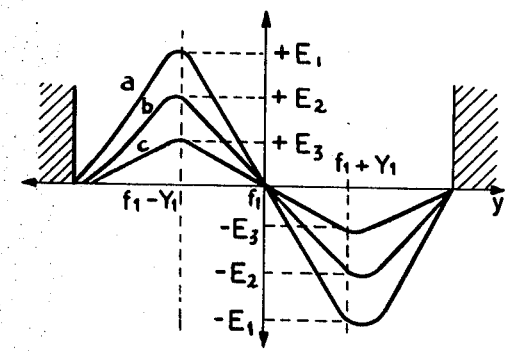
FIG. 5 is a graph illustrating the output characteristics of the phase detector shown in FIG. 4.

In FIG. 5, the ordinate represents the output voltage from the phase detector 30 and the abscissa has the same meaning as in FIG. 3 excepting that the abscissa increases in magnitude by the focal distance $f_1$ of the searching lens 14. As shown in FIG. 5, the phase detector 30 provides a null voltage for $y_1=0$ when the object 16 is located at the distance of $f_1$ from the lens 14. This is because the output signal from the light sensor 22 is doubled in frequency for $y_1=0$ as previously described in conjunction with FIG. 3. Then the phase detector 30 is designed and arranged such that the application of an input signal having a frequency equal to twice the frequency of the reference signal provides a null voltage.

It is noted that FIG. 5 shows several curves labelled with the reference characters $a$, $b$ and $c$. It is now assumed that the phase detector 30 is providing an output as shown at curve $a$ in FIG. 5. It is also assumed that the optical output from the source 10 has decreased, for example, by a factor of about three for some reason. This causes the quantity of light reflected from the object 16 and therefore that emerging from the pinhole 20a to decrease to a quantity equal to about a third the original quantity of light. Therefore the phase detector 30 will provide an output voltage equal to about a third the output voltage previously provided thereby before the source changed in intensity or brightness. This is shown at curve $c$ in FIG. 5.

Also the surface of the object 16 may change in reflection coefficient, color, and/or a tilted angle of that portion thereof being measured to a reference plane from point to point. Such changes also effect a change in the output voltage from the phase detector 30.

If the probe table 26 is being moved in the $y$ direction to change the distance between the object 16 and the searching lens 14, then the phase detector 30 provides an output voltage following any one of the curves such as shown in FIG. 5. The output voltage is then supplied to the servo-drive circuit 32 to drive the servo-motor 34. The servo-motor 34 is operative to maintain the distance between the lens 14 and the object 16 at a predetermined fixed magnitude.

In order to determine the geometry of the object 16, the probe table 26 is moved at a predetermined fixed speed in the $x$ direction to convert the distance between the object 16 and the lens 14 to a movement of the table in the $y$ direction providing a measure of the geometry of the object 16. Thereafter the process as above described is repeated in the $z$ direction.

The system as illustrated is seriously disadvantageous in that the phase detector may provide different output voltages for the same distance of movement of the probe table form the searching lens and such an output voltage actually depends upon the material object to be measured, a tilted angle of that proportion under measurement to a reference plane and so on. In addition, the phase detector provides a null voltage in response to the object located not only at the focus of the searching lens 14, but also at any point remote from the focus on either side thereof, that is, in the hatched regions shown in FIG. 5.

From FIG. 5 it is also seen that the phase detector provides the same output corresponding to two different distances between the object 16 and the lens 14. This leads to an ambiguity in determining the distance.

It will be readily understood that the system is required to automatically search successive points spaced away from the lens 14 by the focal distance $f_1$ thereby to continuously follow these points. However once the system has entered a region corresponding to either of the hatched regions, as shown in FIG. 5, the associated serov mechanism will be stopped. The conventional contact-less probe systems such as shown in FIG. 1 have encountered difficulty when searching points spaced away from the searching lens involved by its focal distance i.e. after it has entered a region corresponding to either of the hatched region as shown in FIG. 5.

The present invention contemplates the elimination of the abovementioned disadvantages and provides a system which may be stably and efficiently operated in a continuous mode to successively search exact points spaced away from the searching lens involved by its focal distance.

Figure 2:
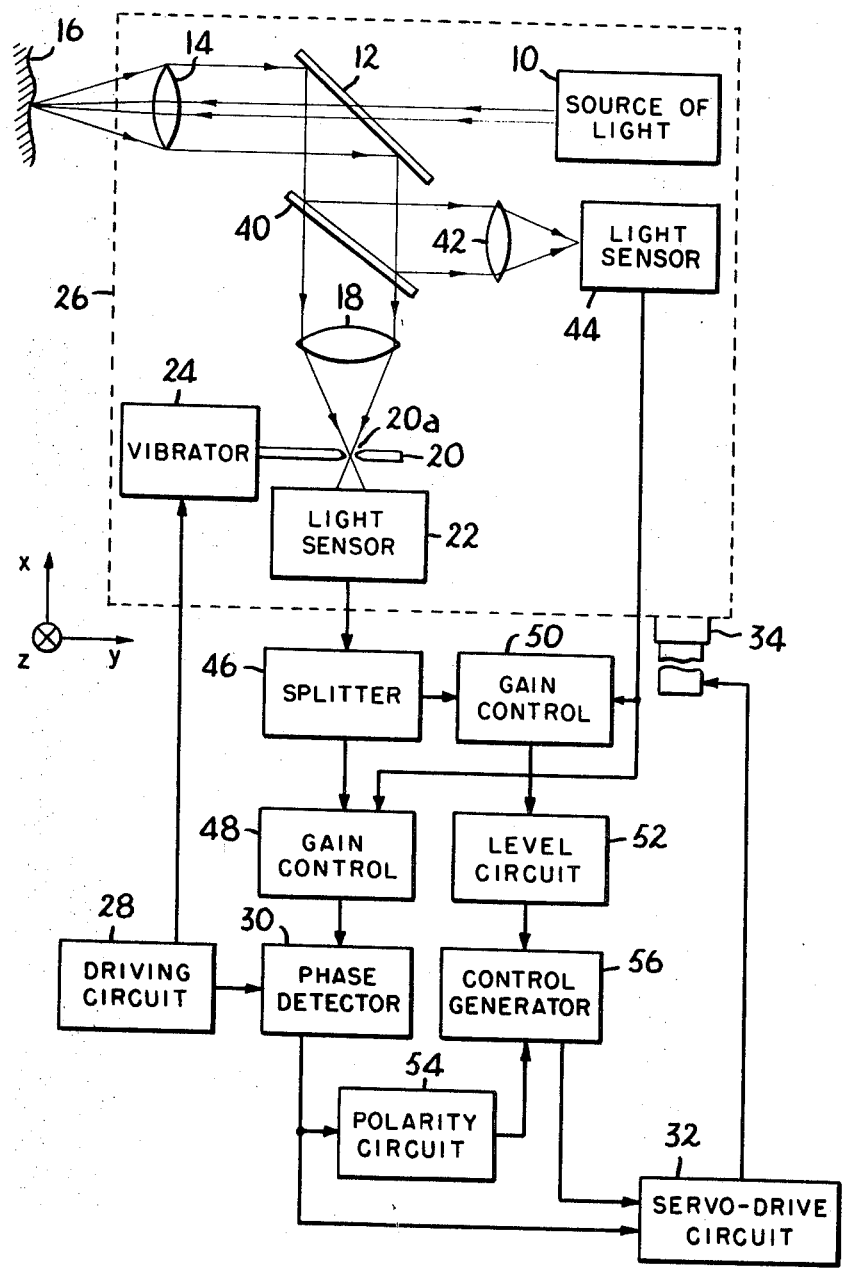
FIG. 2 is a schematic view of a contact-less probe system constructed in accordance with the principles of the invention.

Referring now to FIG. 2 wherein like reference numerals designate the components identical to those shown in FIG. 1, there is illustrated one embodiment according to the contact-less probe system of the invention. The arrangement illustrated comprises, in addition to the components 10 through 22 as shown in FIG. 1, a semi-transparent mirror 40 similar to the mirror 12, a focusing lens 42 and a light sensor 44 similar to the light sensor 22 on the movable probe table 26. The mirror 40 is disposed at an angle of substantially 45 degrees to the optical axis of the lens 18 to transmit one portion of the collimated beam of light reflected from the mirror 12 toward the focussing lens 18 and reflect the remaining portion of the collimated beam toward the lens 42 which, in turn, focusses it onto the light sensor 44. As in FIG. 1, the vibrating pinhole plate 20 modulates the quantity of light passing through its pinhole 20a with the vibration frequency thereof and therefore the light sensor 22 provides an output including an alternating current component modulated with the vibration frequency of the pinhole plate 20 and a direct current component variable in accordance with the distance between the object 16 and the searching lens 14. The alternating current component may be called an "AC signal" and the direct current component may be called a "DC signal" hereinafter.

The output from the light sensor 22 is applied to a signal splitter 46 also disposed outside the probe table 26 to be split into the AC and DC signals. The AC and DC signals from the signal splitter 46 are then supplied to a pair of gain controls 48 and 50 respectively, where their gains are controlled as will be described hereinafter. The gain controlled AC signal is applied to the phase detector 30 where it is phase detected and compared in the same manner as previously described in conjunction with FIGS. 3 and 4 with the result that an output is provided as shown in FIG. 5. The output from the phase detector 30 is supplied to the servo-motor 34 through the servo-drive circuit 32 to control the movement of the probe table 26 in the same manner as previously described.

Figure 6:
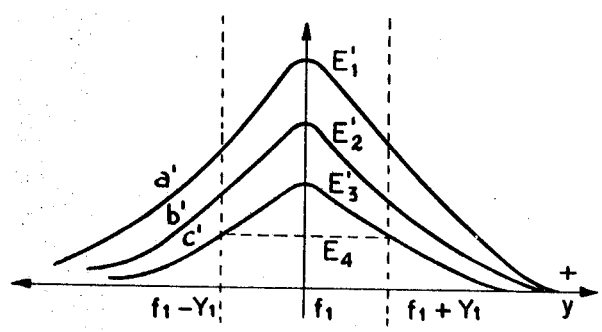
FIG. 6 is a graph illustrating a level characteristic of a direct current signal due to a light emerging from the pinhole.

On the other hand, the DC signal applied to the gain control 50 provides a gain controlled output as shown in FIG. 6 wherein the ordinate represents the output and the abscissa has the same meaning as in FIG. 5.

In order to control the gains of the gain controls 48 and 50, the light sensor 44 is connected to them. More specifically, the light sensor 44 senses beam of light emerging from the lens 42 to provide a DC output proportional to the quantity of light reflected from the object 16 which output is shown in FIG. 7 wherein the axes have the same meaning as in FIGS. 5 and 6.

Figure 7:
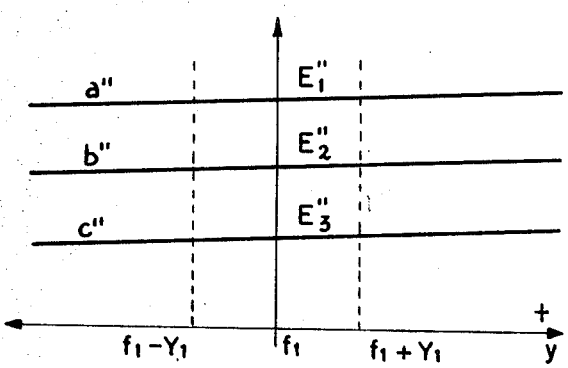
FIG. 7 is a graph illustrating the output characteristics of the second light sensor shown in FIG. 2.

In FIGS. 5, 6 and 7 it is noted that the illustrated voltage levels $E_1$, $E_2$, $E_3$ (see FIG. 5), $E_1'$, $E_2'$, $E_3'$ (see FIG. 6), $E_1''$, $E_2''$ and $E_3''$ (see FIG. 7) are preselected to hold the following relationship:

$$E_1:E_2:E_3=E_1':E_2':E_3'=E_1'':E_2''E_3''$$

That is, assuming that the DC voltage from the light sensor 44 is, for example, at a level $E_3''$ or on a line labelled $c$ (see FIG. 7), the gain controls 48 and 50 are controlled in gain to cause the phase detector 30 to provide its output at the level $E_3$ or following the curve labelled $c$ (see FIG' 5) and simultaneously to cause the gain control 50 to provide its output at the level $E_3'$ or following the curve $c'$ (see FIG. 6) in response to a variation in distance between the object 16 and the searching lens 14.

It is now assumed that the system is required to be operated at the voltage level $E_3$ and also that the output from the light sensor 44 has changed from the level $E_3''$ to a high level $E_1''$ for some reason. Under the assumed conditions, the output voltage from the light sensor 44 is operated to control the gains of the gain controls 48 and 50 such that the phase detector 30 provides the output decreased in level from the magnitude $E_1$ to $E_3$ while at the same time the output from the gain control 50 decreases in level from the magnitude $E_1'$ to $E_3'$. Similarly, where the voltage level provided by the light sensor 44 becomes less than the magnitude $E_3''$ the lower levels increase to $E_3$ and $E_3'$. Thus the outputs from the gain controls 48 and 50 are controlled so as to cause the phase detector 30 and gain control 50 to produce the output continuously following the curves $c$ and $c'$ as shown in FIGS. 5 and 6 respectively.

The output (which corresponds to the DC signal) from the gain control 50 is supplied to a level determination circuit 52 where its level is compared with a reference level. In order to avoid the ambiguity in determining the distance between the object 16 and the searching lens 14, the present system is pre-selected to be operative within a region corresponding to a range of outputs from the phase detector extending over one of the peak points up to the other peak point on each curve shown in FIG. 5. This operative region is shown in FIGS. 5, 6 and 7 as being defined by a pair of vertical dot lines passing through points $v_1=f_1+Y_1$ and $y_1=f_1-Y_1$ respectively. As clearly shown in these figures, the output within the abovementioned range varies as a substantially linear function of the distance between the object 16 and the lens 14.

Once the operative region of the system has been determined as above described, the level determination circuit 52 has preferably established therein a reference voltage level corresponding to a line passing through the points at which the vertical dotted lines intercept the particular curve $c$ at the level $E_3'$ as shown in FIG. 6. The level $E_3'$ corresponds to the required gain of the system as above described. As shown in FIG. 6, the curves are symmetrical with respect to a vertical line passing through a point $y=f_1$ so that the reference level is represented by a dashed line parallel to the abscissa and labelled the reference character $E_4$.

If the signal applied to the level determination circuit 52 is determined to have a level higher than the reference level $E_4$ the circuit 52 provides a positive output signal indicating that the system is operating in the operative region. Alternatively, if the level of the signal applied to the circuit 52 is less than the reference level $E_4$, the circuit provides a negative output signal indicating that the system is operating outside the operative region.

On the other hand, the output from the phase detector 30 is always at a point on the curve $c$ at the level $E_3$ as shown in FIG. 5. That is, it may be positive or negative in accordance with the distance between the object 16 and the lens 14. Therefore the polarity of the output must be determined. To this end, the phase detector 30 is also connected to a polarity determination circuit 54. When the level determination circuit 52 has determined that the system is outside the operative region and if the output from the phase detector 30 is positive, then the polarity circuit 54 provides a positive output signal indicating that the probe table 26 is at a position where its deviation $\Delta Y$ from a point $y_1=f_1$ in the $-y$ direction is smaller than $(f_1-Y_1)$, that is to say, it is near to the object 16 and outside the operative region. Under these circumstances, a voltage generator 56 supplied by the polarity circuit 54 generates a control voltage to control the servo drive circuit 32 to move the probe table 26 away from the object 16 through the servo-motor 34 until it enters its operative region.

On the contrary, if the output signal from the phase detector 30 is negative, the polarity circuit 54 provides a negative output indicating that the probe table 26 is remote from the object 16 and outside the operative region. This causes the generator 56 to generate a control voltage of the reverse polarity from the previous case to effect movement of the probe table 26 toward the object 16 through the servo-motor 34 until it enters the operative region with the servo-drive circuit 32 not affected directly by the phase detector 30.

After the level circuit 52 has determined that the system is within its operative region the output from the phase detector 30 directly controls the servo-drive circuit 32 to maintain the probe table at its position represented by $y_1=f_1$ in the manner previously described.

Figure 8:
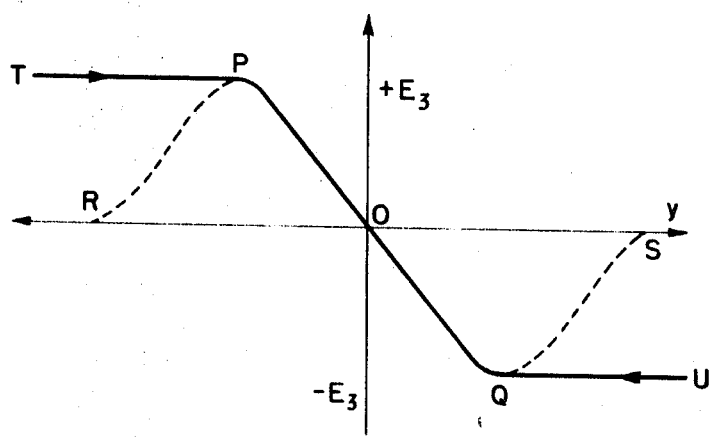
FIG. 8 is a graph illustrating a waveform of a control signal provided by the system shown in FIG. 2.

FIG. 8, wherein the ordinate represents a voltage level and the abscissa represents a distance between the object and the searching lens, illustrates a waveform of a control voltage provided by the present system. The portions T–P and U–Q of the waveform indicate the voltage levels provided by the voltage generator 56 when the level circuit 52 has determined that the system is outside the operative region while the portion P–O–Q indicates the voltage level provided directly by the phase detector 30 when the level circuit 52 has determined that the system is within the operative region. The portion P–O–Q is smoothly merged into the adjacent ends of the portions T–P and U–Q. Dotted lines RP or SQ indicates the voltage level provided by the phase detector 30 in the abscence of the level and polarity circuits 52 and 54 respectively and the associated components.

From the foregoing it will be appreciated that the invention has provided a contact-less probe system capable of always following a focus of a searching lens involved, irrespective of its position.

The invention has several advantages. For example, it always has the control function and much expands the apparent operative region because the operative region is determined by both the output level of direct current contained in the output from the light sensor, having its gain automatically controlled with one portion of a quantity of light reflected from an object to be measured, and the polarity of output from a phase detector involved.

What we claim is:

1. A contact-less probe system for determining the geometry of an object comprising: light means for producing a parallel beam of light, lens means for focusing the parallel beam of light from said light means onto a point on the surface of the object being tested, means defining a pinhole disposed to receive a beam of light reflected from said point on the surface of the object being tested, vibrating means for effecting vibration of said pinhole defining means in a direction substantially parallel to the optical axis of said reflected beam of light to effectively modulate the intensity of the reflected beam of light, light sensor means for sensing the intensity modulated light from said pinhole to provide an electric output signal, splitting means for splitting said electric output signal into a direct current signal and an alternating current signal, control means for controlling the gains of said direct and alternating current signals in accordance with the intensity of said reflected beam of light, phase detector means for phase comparing said gain controlled alternating current signal with a reference signal comprising an electric waveform representative of the vibration of said pinhole and providing a corresponding output signal, means for determining both the output level of said gain controlled direct current signal and the polarity of the output signal from said phase detector means to determine the operative region of the system, and servomotor means driven in accordance with the output signal from said phase detector means to maintain a constant distance between said lens means and said object being tested, whereby the geometry of the object may be determined.

2. A contact-less probe system comprising: light means for producing a parallel beam of light, first lens means for focusing the parallel beam of light from said light means onto a point on a surface of an object to be tested and collimating a beam of light reflected from said point on the surface of the object, a first semi-transparent mirror member positioned to reflect the collimated beam of light emerging from said first lens means, a second semi-transparent mirror member for transmitting one portion of the collimated beam of light reflected from said first semi-transparent mirror member and reflecting the remaining portion of the collimated beam of light, second lens means for focussing the beam of light transmitted through said second semi-transparent mirror member, a pinhole plate having means therein defining a pinhole disposed at the focus of said second lens means, means for vibrating said pinhole plate in a direction substantially parallel to the optical axis of said second lens means to modulate the intensity of the beam of light from said second lens member, first light sensor means for sensing the intensity modulated beam of light to provide an electrical signal, signal splitter means for receiving said electrical signal to split it into a signal portion of alternating current and a signal portion of direct current, second light sensor means for sensing the beam of light reflected from said second semi-transparent mirror member to provide a direct current signal, first and second gain control means responsive to the direct current signal provided by said second light sensor means to control the gains of said signal portions of alternating and direct currents produced by said signal splitter means respectively, phase detector means for phase comparing the alternating current signal portion from said first gain control means with a reference signal representative of the vibration of said pinhole plate and providing a corresponding output signal, level determination means for determining the level of the direct current signal provided by said second gain control means, polarity determination means for determining whether the output from said phase detector means is positive or negative, a movable probe table having disposed thereon the above-mentioned optical components, means responsive to the results of the determination effected by said level and polarity determination means to produce a control signal, and means responsive to both said control signal and the output signal of said phase detector means to maintain said probe table a constant distance from said object, whereby the geometry of the surface of the object may be determined.

References Cited

UNITED STATES PATENTS

| | | |
|---|---|---|
| 3,481,672 | 12/1969 | Zoot. |
| 3,520,607 | 7/1970 | Zoot. |
| 3,506,839 | 4/1970 | Shigeru Ando et al. |
| 2,607,270 | 8/1952 | Briggs _____ 356—156 |
| 3,041,495 | 6/1962 | Greene Jr. _____ 250—201 |
| 3,054,898 | 9/1962 | Westouer et al. _____ 356—4 |
| 3,385,159 | 5/1968 | Bliss et al. _____ 350—235 |
| 3,434,785 | 3/1969 | Webco _____ 356—4 |
| 3,491,240 | 1/1970 | Vyce _____ 356—4 |
| 3,495,913 | 2/1970 | Hoagland _____ 356—4 |
| 3,506,839 | 4/1970 | Ando et al. _____ 250—232 |

FOREIGN PATENTS 619,621  1961  Italy _____ 356—156

RONALD L. WIBERT, Primary Examiner

J. ROTHENBERG, Assistant Examiner

U.S. Cl. X.R.

250—232; 356—167